Sept. 1, 1925.
J. REECE ET AL
POWER TRANSMISSION
Filed Sept. 15, 1923
1,551,695
3 Sheets-Sheet 1
Fig. 1.
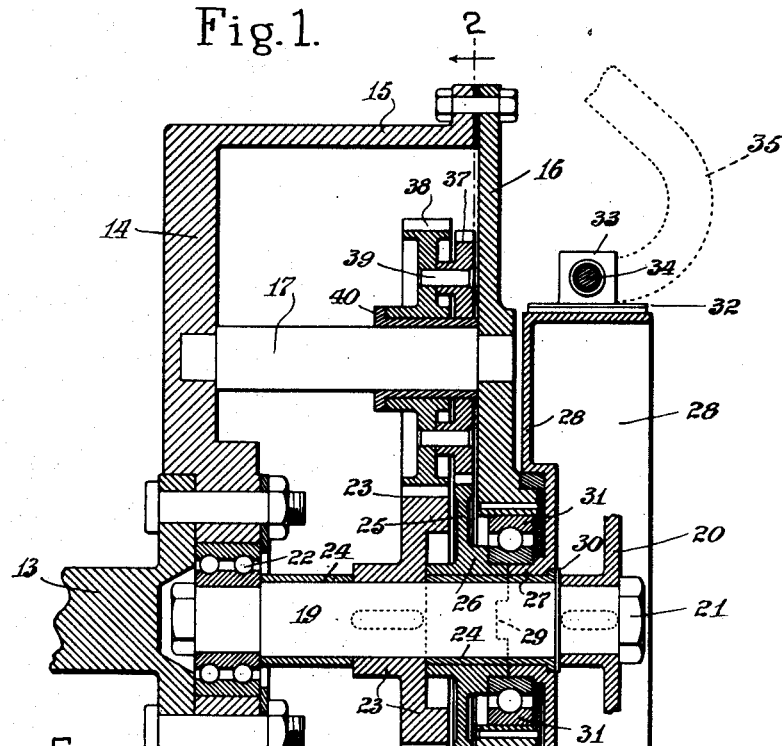
Fig. 5.
Fig. 4.
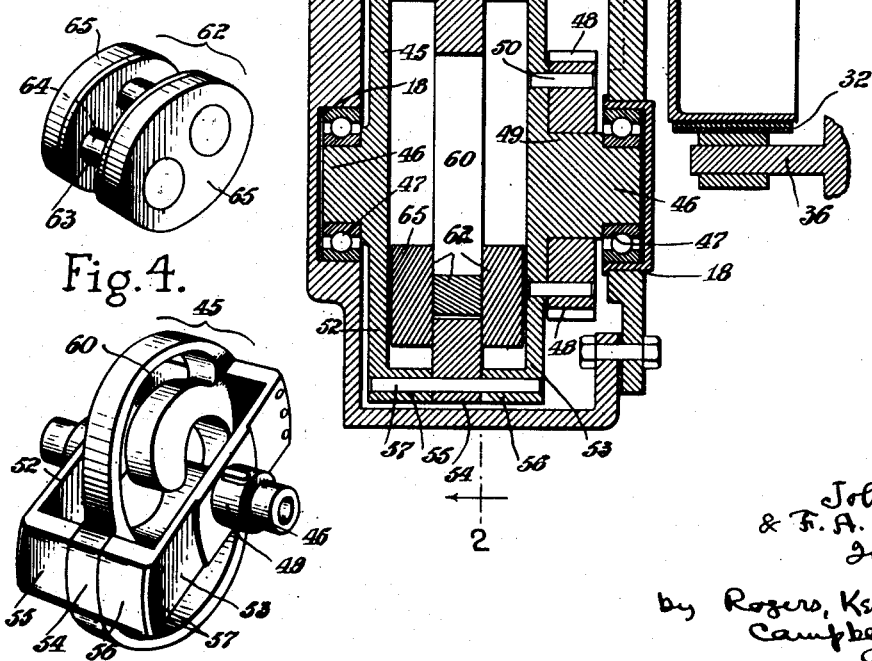
John Reece
& F. A. Reece
Inventors,
by Rogers, Kennedy &
Campbell,
Attorneys.

Sept. 1, 1925.

J. REECE ET AL

POWER TRANSMISSION

Filed Sept. 15, 1923

John Reece
& F. A. Reece
Inventors, by Rogers, Kennedy &
Campbell
Attorneys.

Sept. 1, 1925.  
J. REECE ET AL  
POWER TRANSMISSION  
Filed Sept. 15, 1923  
1,551,695  
3 Sheets-Sheet 3
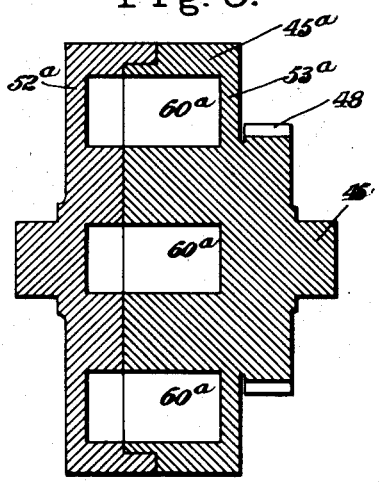
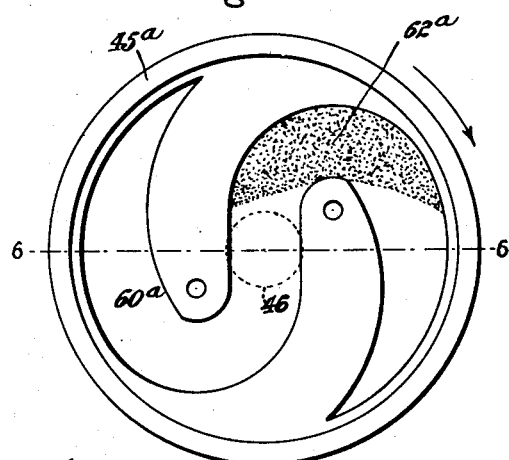
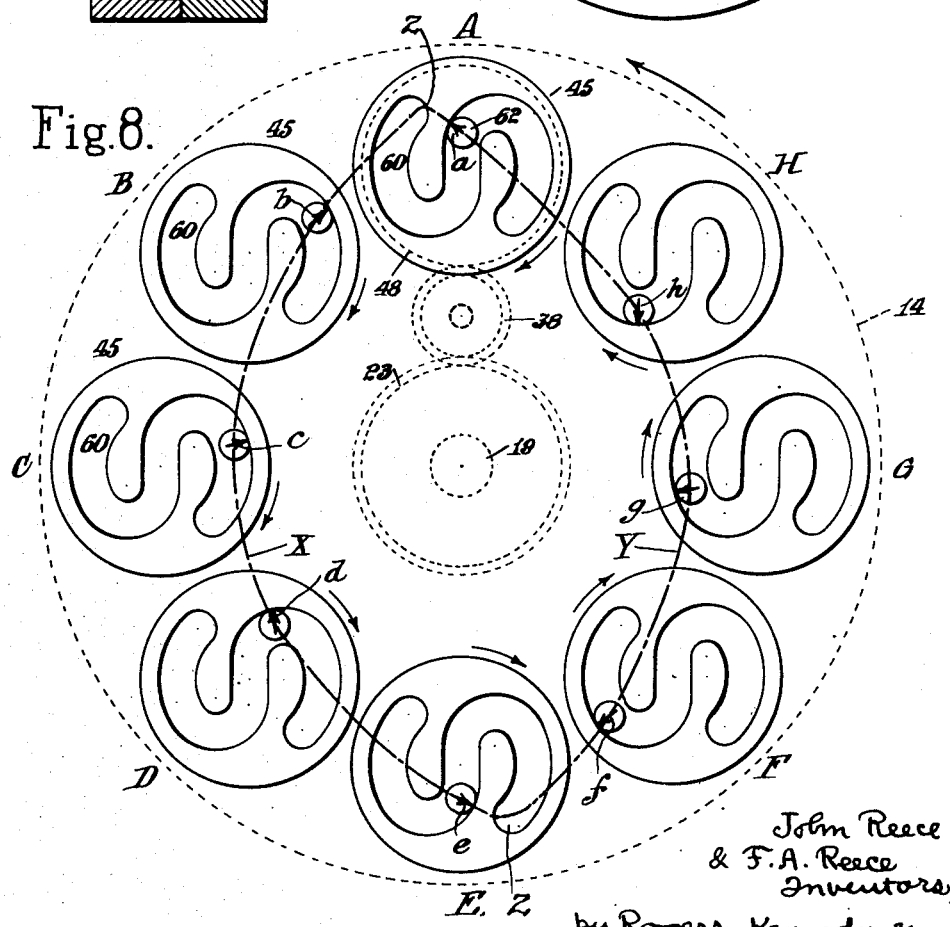
John Reece  
& F. A. Reece  
Inventors,  
by Rogers, Kennedy &  
Campbell, Attorneys Patented Sept. 1, 1925.

1,551,695

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed September 15, 1923. Serial No. 662,964.

*To all whom it may concern:*

Be it known that we, JOHN REECE and FRANKLIN A. REECE, citizens of the United States, residing at Boston and Brookline, respectively, in the counties of Suffolk and Norfolk and State of Massachusetts, have invented certain new and useful Improvements in Power Transmission, of which the following is a specification, reference being had therein to the accompanying drawing.

This invention relates to power transmission, and involves a novel method and apparatus adapted for the transmission of power for various purposes and in various situations, especially where the load or speed is variable, for example, as with motor vehicles.

In common with prior applications the general object hereof is to enable changes of speed ratio between the driving member or shaft and the driven member or shaft, not by any step by step adjustment, but by gradual or continuous changes through all intermediate ratios, and preferably from unity ratio down to zero speed of the driven shaft. Moreover the general plan is to secure a readjustment of the speed or ratio to correspond to the conditions or load in a self acting manner, without the manipulations of the usual clutch and gear shift, or other attention by the operator. Thus, for example, in the driving of a motor vehicle when the road conditions change the operation is that the speed ratio and torque will accommodate themselves so as to give the most effective results; whereby with any given conditions of resistance or load on the driven parts the maximum driven speed thereof will be attained which is consistent with the conditions of speed and power in the engine at the time, as determined by the throttle or otherwise. If the vehicle should encounter an increase of grade, this increases the load on the driven shaft, thus slowing down the vehicle and the shaft; and this invention utilizes this slowing down, and the consequent increase of speed difference in the driving and driven members, to effect an alteration in the transmitting action such that the required increased torque is delivered, and without the need of attention by the operator. A great range of speed ratio and torque is permitted. When the load is sufficiently light the driven shaft may be rotated at the full speed of the driving shaft, or with a speed ratio of one to one, under which conditions the entire mechanism may rotate as a unit and there will be no play or internal motion of the parts of the transmission and consequently no wear. On the other hand, with increase of load, the ratio may decrease toward or substantially to zero. Control by the engine throttle is additional or supplemental to the self control of the transmission, and by manipulating the throttle the operator can at will increase or decrease the developed power, and speed up or slow down the engine and therefore the driven shaft, this being the only attention required for driving the vehicle under varying conditions.

The class of transmission to which the present invention relates is that in which a mass or body, centrifugally acted upon, is movably mounted on the driving member or fly wheel so as to be carried around therewith, subject to centrifugal force, while controlled in its movements from the driven member or shaft, being compelled to move inwardly or against the centrifugal force, when the two shafts are turning at different speeds, so that the centrifugal force is applied to the driven shaft to overcome the load thereon. In such class of apparatus a difficulty has been the proper manipulation or disposal of the mass or body at the completion of its inward or operative transmitting movement. In one prior invention this was taken care of through the use of a succession or procession of mass portions or bodies, not united with but engaging the device or carrier on the driving member, and compelled to move inwardly in succession by the device or carrier in such a way that there is always an inward forcing action, so that there will be a continuous centrifugal force action applied to deliver torque to the driven shaft; each mass portion or body being discharged from the carrier, or at least ceasing its operative co-action, at the completion of its inward movement, and thereupon returning outwardly in a second or inoperative phase. This inoperative phase or outward return movement of each mass or body constituted a factor requiring either the use of a second carrier to conduct the successive masses outwardly and there restore them to the main carrier, or requiring the loose discharge of the bodies with resultant loss of energy and liability to wear, vibration or injury.

The present invention is distinguished from the prior apparatuses mentioned, and from all other known prior apparatuses in the fact that the mass or body, or each of them if there be a number, constitutes, with its carrier, and the connections to the driven shaft, a complete transmitting means, in which the centrifugal force is operative with substantial continuity to oppose the driven shaft load, and thereby effect substantially continuous transmission of torque from the driving to the driven shaft, with all the advantages of self adjustment to conditions as before described. This result is effected by employing a controlling or guiding means for the mass or body such as to afford an operation at substantially all times and phases by which the mass is constrained, deflected or diverted inwardly from its natural path, so that the centrifugal force of the mass is always opposed to the planetating or other movement of its control means or carrier, and is thereby opposed to the driven shaft load. There is no return or outward phase or movement of the mass such as to tend to offset the desired transmitting action, the mass or body, as it plays on its control device or carrier, always exerting its inertia or centrifugal force to resist the planetating motion and thereby to transmit to the driven shaft, or at least never substantially acting to the contrary effect. As with the prior inventions the effectiveness and steadiness of the transmission may of course be improved by multiplying the number of units or control devices or carriers and masses employed in the transmission apparatus. The effectiveness of each mass as a transmitting instrument is increased by increasing its weight, giving greater centrifugal force and torque delivery, and, according to the law of centrifugal force, the effectiveness is greatly enhanced by increasing speed of rotation, the force increasing with the square of the speed, as the engine is speeded up.

The further and more detail features and principles of the present invention will be hereinafter explained more fully in connection with the specific embodiment to be described for the purposes of illustration of such principles. In addition to the objects and advantages above referred to other objects and advantages will be elucidated in the following description or will be apparent to those skilled in the art.

In the accompanying drawings Fig. 1 is substantially a central longitudinal section view of one form or embodiment of a transmission apparatus embodying the principles of the present invention, the same taken on the broken line 1—1 of Fig. 2 and the parts indicated in the position they will assume when driving the driven member forwardly at unit ratio or the same speed as the driving member.

Fig. 4 is a perspective view of one of the planetating carriers detached from the apparatus.

Fig. 5 is a perspective view of one of the centrifugal weights detached from its carrier.

Figs. 6 and 7 show a modified embodiment, using a flowing or liquid weight or mass, the figures being in central cross section and interior elevation respectively.

Fig. 8 is a diagram in which one of the planetating devices or carriers is supposed to be indicated in a number of successive positions, with the centrifugal weight shown in its approximate positions, for the purpose of explaining the operation of the apparatus.

Figure 2:
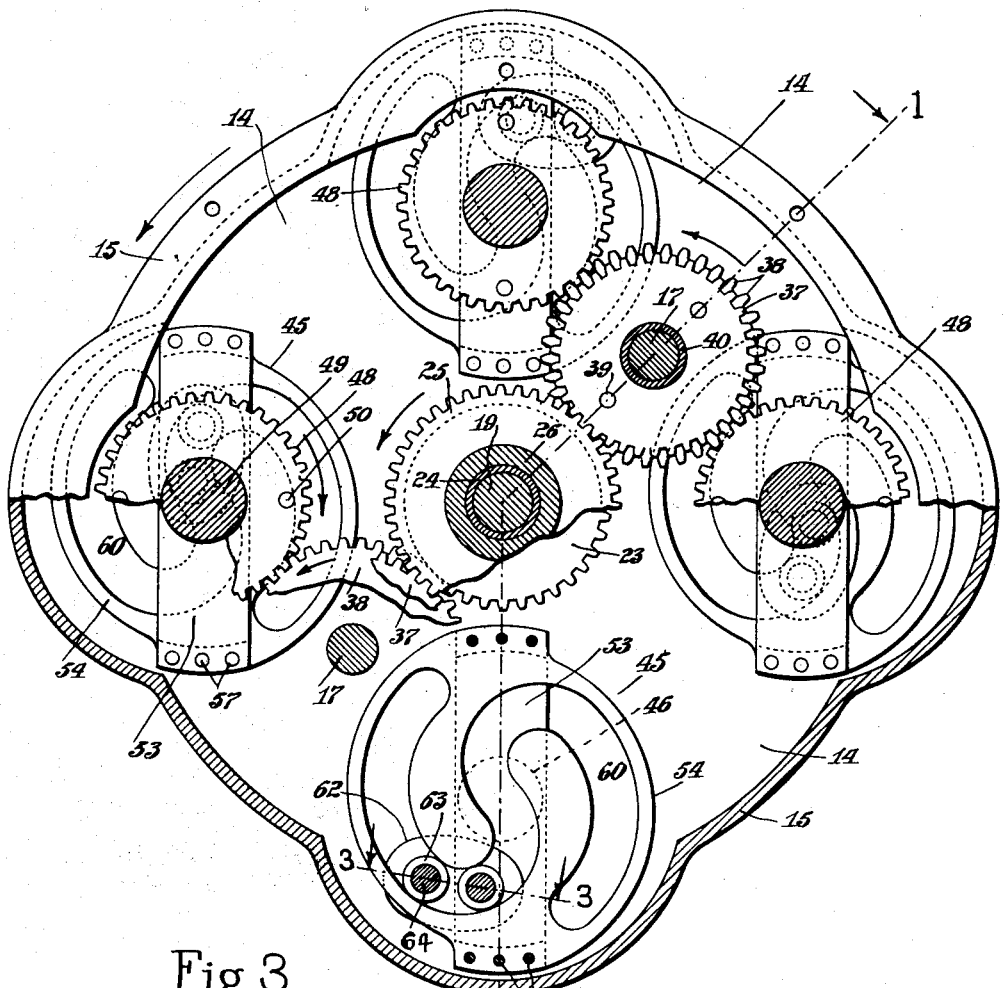
Fig. 2 is a right hand elevation partly in transverse section on the broken line 2—2 of Fig. 1, and with the parts in the same position.
Figure 3:
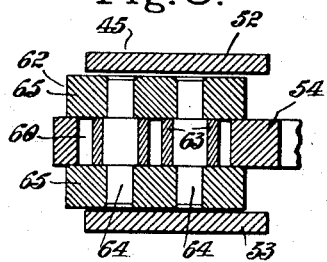
Fig. 3 is a detail section view taken on the plane 3—3 of Fig. 2, showing one of the centrifugal weights or bodies and its relation to its controlling or planetating device, carrier or guide.

The mechanical elements will first be described, and subsequently the mode of operation.

The driving member 13 may be the crank shaft of an internal combustion engine such as is chiefly used on motor vehicles; and attached to the shaft is shown a wheel, disk or support 14 which, with the mechanism carried with it, may be considered as the fly wheel, and affords the steadying effect required by such type of engine. The fly wheel or driving member 14 is shown as hollow for the purpose of containing mechanism to be described, having a rim 15, and a closure or cover 16 peripherally bolted to the rim. Extending through the fly wheel from its disk to its cover are studs 17, two of these being shown, for the purpose of giving support to certain gears which are to be described. Additionally the fly wheel disk and cover are formed with recesses or cups 18 intended to support the bearings within which are to rotate the planetating devices or carriers, later to be described. The elements 13 to 18 are shown rigidly connected, and may be considered as constituting the driving member of the combination.

The driven parts of the illustrated apparatus comprise, in the first place, the driven member or shaft 19, which it is desired shall rotate at varying speed ratios in relation to the driving member. The righthand extremity of the shaft is shown provided with a part 20 which may constitute a portion of the usual universal connection to a further transmitting shaft, the portion 20 being confined by a nut 21. The driven shaft, at its left end, is provided with a ball bearing 22 interposed between it and the driving member. A gear wheel 23 is shown having its hub keyed directly to the driven shaft and spaced longitudinally by sleeves 24, 24. The described elements 19 to 24 are shown rigidly connected, and taken together they may be considered as the driven member of the combination.

The drawings show a simple reverse mechanism which constitutes no essential part of the present invention, but only an auxiliary which may usefully be combined with the apparatus for certain purposes. This reverse mechanism is inoperative during the normal running of the apparatus or motor car, but can be put into effect at will. For convenience this mechanism will be described in advance of the mechanism particularly constituting the invention. A central gear 25 is shown loose upon the driven shaft, or rather the sleeve or bushing 24 thereon, and somewhat to the right of the driven shaft central gear 23. The gear 25 has a rightwardly extending hub or sleeve 26. Adjacent thereto is a sleeve 27 constituting the hub of a brake drum or pulley 28. The two sleeves 26 and 27 are effectively locked by a simple lug and notch device 29, as indicated in Fig. 1. The pulley is thereby rendered substantially unitary with the gear 25. A washer 30 is shown between the bushing 24 and the parts to the right thereof. In order to give greater stability to the rotation of the driven member a ball bearing 31 is shown interposed outside the sleeves 26 and 27 and between them and the fly wheel cover plate 16. For effecting reverse adjustment it is arranged to brake or hold the drum or pulley 28 against rotation. For this purpose the drum is shown surrounded by a brake band 32, the ends of which are provided with lugs 33, which are engaged by a threaded shaft 34 adapted to be rotated by a pedal lever 35 in order to force the lugs together and thereby tighten the band upon the drum, the band being shown anchored to a stationary part 36. When the reversing drum 28 is fixed against rotation it effects reverse drive through a pair of planet gears 37 and 38 engaging respectively with the reversing central gear 25 and the driven shaft central gear 23. The two gears 37 and 38 are mounted on the planet studs 17 and are secured to each other by connecting pins 39, a bushing 40 being interposed between the gears and the stud. It will be noticed that the gear 25 is larger than the gear 23 and the gear 37 correspondingly smaller than the gear 38. Therefore when the gear 25 is rendered stationary by the reversing pedal 35, the planetary gears will rotate on their stud, and will act upon the gear 23 to revolve it and the driven shaft at low speed, and in a direction which is reverse of the rotation of the driving parts, which as seen in Figs. 2, 7 and 8, is counterclockwise. When the reversing mechanism is released the gears 25 and 37 become inoperative, and they and the brake drum may rotate idly. The further description of the invention will be made without reference to these. The gear 38 and the driven shaft gear 23 are important elements in the operation of the present invention and will be further referred to.

In one way the principle of the present invention may be stated as involving a device or carrier which is carried around bodily with the rotation of the driving member, and with a mass or body arranged to engage with the device or carrier, and connections from the driven member such that the speed difference of the driving and driven members actuates or planetates the device or carrier thereby and compels the mass or body to travel, as it is carried around the general axis, in a path which differs at substantially all times from the natural or free path thereof, and opposed by its centrifugal force, in such a way as to give reactions whereby this centrifugal force tends to resist the stated actuation of the device or carrier, whereby torque will be delivered in one direction only to the driven shaft. The device or carrier is preferably a planetating guide for the mass or body, operating always to divert, deflect or constrain the mass inwardly against the tendency of centrifugal force, so that in this way the centrifugal force is utilized as a continuously active principle by which rotary energy or torque is transmitted to the driven shaft. Each carrier with its mass or body constitutes a substantially complete transmitting system, delivering substantially continuous thrust to the driven shaft. The play of the parts and the extent of operation of the carrier and mass will vary, becoming less as the driven shaft speed approaches that of the driving shaft, so that if the load be not too heavy, in view of the existing engine speed and centrifugal force, the two shafts may turn at the same speed, without any internal motion of the carrier or mass, the centrifugal force of the latter then operating to hold the parts substantially in a definite relation. The improvement is believed to be novel as a method of transmission, and the mechanical embodiment thereof is believed to be generically new.

The device or carrier or guide which operates the centrifugal mass preferably takes the form of a planetating member 45. This may be generally in the form of a wheel or disk, and to fit it for planetating rotation it is shown formed with axial extensions or bosses 46, see Fig. 1 and 4, these engaging in the bearing cups 18 on the fly wheel parts 14 and 16, with ball bearings 47 interposed.

In order to planetate the carriers 45 each of them may be provided with a gear 48 mounted upon an enlargement 49 of one of the bosses 46 and secured by pins or rivets 50. Each of the planetary gears 48 is shown in mesh with one of the planetary gears 38, already mentioned, this in turn being in mesh with the driven shaft central gear 23. In this way any relative rotation between the two shafts effects planetation of the carriers. As a matter of convenience and illustration the driven central gear 23 is shown of the same diameter as the planet gears 48. Owing to this, if the driven shaft be held stationary while the driving shaft is rotating, the planet gears 48 and the carriers will rotate on their axes at the same speed as the driving shaft rotation. Owing to the presence of the intermediate planet gear 38 the planetating rotation of the carriers will be the reverse of the rotation of the driving shaft. The driving shaft rotation is counterclockwise in Figs. 2 and 8, while the carriers rotate clockwise; this fact being of importance because giving greater efficiency than an arrangement in which the intermediate gear is omitted and no substitute provided to cause reverse direction of planetary rotation. Owing to the described arrangement and the fact that the gears 23 and 48 are shown of the same diameter, each carrier, while planetating on the driving member or fly wheel will have no actual rotation. This is indicated in Fig. 8 where the carrier 45 is shown in the same position (posture) through each of its locations. This is of no importance as the planetary rotation might be faster or slower than the driving shaft rotation, but the described proportions are convenient to facilitate the description of the operation.

Each of the planetary carriers may be a built up member consisting of a left hand section or frame part 52, and opposite to this a corresponding section 53, these sections formed with the bosses 46 and 49, already described. Between the side pieces or sections 52 and 53 is shown the guide portion 54. In order to give clearance for operations each of the side sections 52 and 53 is provided at each end with an inward extension 55 or 56. The guide section 54 is held directly between these extensions, and rivets 57 are extended through the parts to hold them permanently in rigid relation.

The guide or path member or controller 54 is intended to be engaged directly by the centrifugal body or mass and is therefore provided with suitable engaging or guiding means therefor, herein shown as a path or groove 60, of such character as to compel the mass to move or travel in a certain manner as will be described.

The centrifugal weight, mass or body may take different forms, such, for example, as the sliding weight 62 shown in Figs. 1, 2, 3 and 5. This is of such construction as to possess considerable mass or weight, so as to increase its centrifugal force and therefore the effectiveness of the transmission. It is shown as comprising rollers 63 which engage and run directly in the groove 60, and pins 64 extending through the rollers from side to side where the opposite disks 65 are secured to the pins. This built up weight member or centrifugal body 62 is capable of moving around in the various portions of the groove 60, and in Fig. 2 the several weights are shown in different positions in the several carriers.

Instead of the open construction of carrier as in Figs. 1 to 4, with a weight sliding in a groove, a closed form of carrier 45$^a$ may be employed as in Figs. 6 and 7. This may in principle be similar to the other, but the two side members 52$^a$ and 53$^a$ are arranged to fit closely together so that the groove 60$^a$ is wholly enclosed. Thereby it is only necessary to deposit in the groove, before the assembly of the parts, any loosely moving or rolling or flowing mass or body, which may take the form of a body of liquid 62$^a$, for example, mercury, capable of moving to and fro within the groove analogously to the movements of the solid mass or body 62.

In using the term "planetating" or "planetary" for the devices or carrier 45 it is intended to include a device which is carried or revolves around bodily with the driving member while at the same time capable of undergoing its own rotary or any equivalent motion such as to cause the centrifugal mass or body to pass through substantially the described actions. By a "carrier" is intended any guiding or controlling or other device adapted to carry or cooperate with the centrifugal body or mass for such purpose. The word "body" is intended to include any sort of mass or weight, either liquid or solid, or an aggregation, which is capable of being operated in the manner described so as to apply its inertia or centrifugal force to the resistance of the planetating motion or to the driving of the driven member.

The method involved in the present invention may be described as causing the body to travel around with the driving member, for example in engagement with its carrier, and at the same time to undergo relative movements, compelled by the driven member, such that its inertia or centrifugal force is substantially continuously opposed to the resistance of the driven member, so that it drives the driven member always in one direction. The speed difference of the driving and driven members may be said to cause such movements in the body that its inertia tends substantially continuously to rotate the driven member in one direction. This may be said to be effected by causing the body, as it travels around with the planetating carrier, to be constrained or deflected always away from its natural course, with an inward trend, so that the inertia in the body is applied to resist the planetating rotation and thereby operates as a thrust in one direction only upon the driven member. While the carrier planetates, the inertia body, without discharge from the carrier, shifts to and fro thereon in such a manner that in each phase or portion of its action or movement it is operating in one manner, namely, its inertia, or tendency to continue in centrifugal motion, is applied to the carrier in a direction to resist the planetation thereof, with the result, as before stated, that the driven member is being urged constantly in one direction.

The diagram Fig. 8 indicates the action. As the carrier 45 moves around bodily near the rim of the fly wheel or driving member it is suitably planetated, preferably in a reverse direction, as by the gears 23, 38 and 48. As the gears 23 and 48 are shown of the same diameter the planetation is at the same speed as the fly wheel rotation, so that the carrier appears in substantially the same position throughout. A different gear ratio would give faster or slower planetation and a constant alteration of position of the carrier, but without any difference in principle, and no difference in result excepting that the actions which on the diagram will be explained as occupying a full rotation would take place in a greater or less extent of rotation.

On the diagram the eight successive positions of the carrier 45 are indicated by the letters A, B, C, etc. The movement of the weight or body 62, in this case a sphere or roller, may be somewhat irregular, but by observation and test the movement has been found to be substantially as indicated on the diagram. As the carrier revolves and rotates, the sphere 62, controlled by the path or groove 60 and influenced by its own inertia or centrifugal force, assumes successive positions in its groove or path 60. Considered in its relation to the path the body preferably moves to and fro or oscillates. Considered in space the body takes a more or less definite path of a curved nature surrounding the axis of the system. The effect of the inertia of the body, referred to as centrifugal force, will be to maintain its motion in a straight line, whereas the control afforded by the planetating carrier or guide is such as continually to deflect or constrain the body, which thereby moves in a curved path, tending always inward from the natural path, so that the pressure of the carrier or guide on the body is to an extent inward, whereas the tendency of inertia is to carry the body outward, so that in a true sense the inertia or centrifugal force may be said to oppose the pressure or effect upon the body caused by the action of the planetating carrier or guide.

The body 62 is shown in its successive positions in each part of the diagram, and in connection with each is applied a small arrow $a$, $b$, $c$, etc., indicating the direction of pressure of the body upon the carrier or the walls of its groove. On the diagram have been added diagram lines X and Y showing approximately the path of the body in space from one apex Z to the opposite apex Z of its movement. Observation has confirmed that with a driving wheel and carrier as shown the body will move substantially through the path X, Z, Y, Z, and on the diagram the several successive positions of the center of the body will be found to be on this path.

To describe the action in full detail is unnecessary, but the reactions may be explained by the diagram as follows, it being understood for convenience that the driven shaft 19 and the gear 23 are supposed to be held stationary, while the intermediate gear 38 delivers a clockwise rotation to the carrier, the opposite to the counterclockwise rotation to the fly wheel 14.

At position A the body 62 will stand about as shown. It is moving outward along the path Y and is being retarded in its movement by the side of the groove of the reversely planetating carrier. It therefore exerts a pressure on the carrier in the direction of the arrow $a$. This gives a moment or force with respect to the center of the carrier tending to rotate it counterclockwise, in other words tending to resist the planetating motion which is caused by the connection with the driven shaft. This manifestly delivers a driving force to the driven shaft.

In position B the body has shifted and it is traveling along the path X and is being accelerated by its cooperation with the carrier. Due to this the body exerts a pressure as indicated by arrow $b$. The moment of forces again is such that the inertia of the body causes counterclockwise thrust. During the travel from A to B a similar acceleration and pressure are taking place.

The body reaches about the limit of its travel in the particular groove 60 at about position C. For an instant the body may be free, and it is traveling slower than the carrier so that it is about to reverse its oscillating movement and run back as indicated by the next position D.

Beyond the position D and somewhere between it and position E the body not only advances in, but crosses to the opposite side of, the path or groove, so that in the remaining positions E, F, G and H the actions are substantially duplicates of those described, in the other portion of the groove.

The movement of the body with relation to its carrier may be divided into phases, in the illustrated embodiment four phases. From a point between H and A it travels outward along one leg and one side or surface of the grooved path until a position near C; then it reverses and travels back along the same path until, at a point between D and E it leaves the first side of the groove, crossing at about the center of the carrier; then it travels along the other leg and at the opposite side of the groove until about point G; thence in the fourth phase returning over this path. While there may be a negligible instant of neutral operation at the transition points between phases, the action during each phase, as indicated by the arrows a—g is that centrifugal force resists planetation; and the torque is therefore always delivered in one direction to the driven shaft. One body and its groove may therefore afford a complete transmission, but as the pressure may vary in amount through the phases of action, it is preferred to have several carriers and bodies, four being shown, each opposite pair being in corresponding relation, but the two pairs effectively in different relation, so as to give overlap of action and increased steadiness of transmission. While four phases of action may exist with a groove or guid giving an S-shaped path as shown, this is merely a preferred form of construction, as the S-groove could be replaced by various other shapes, with a greater or less number of phases and transitions of action, and the body remaining engaged with the carrier, and not discharged, and yet acting substantially only in one manner in all phases, or through substantially the whole period or cycle, namely to resist the planetation and to drive the driven shaft. As a control means for guiding the body a groove is not essential, since any mechanism for determining its path would serve, and the body need not be physically free to move along its path in an unconstrained manner as shown. The path and groove are shown of greater extent than necessitated by the actual travel of the body in the described action, but a closed groove confines the body against detachment under all conditions, and a prolonged path allows for variation of travel under varying conditions. It has been stated that the body is preferably deflected or diverted by the action of the carrier in a direction inwards from its natural course, but in some cases the deflection might be otherwise, the underlying principle being that the reactions caused are such as always to resist or oppose the planetating rotation, rather than assisting or accelerating it.

It will thus be seen that a power transmission method and apparatus have been described embodying the principles of this invention and attaining the objects mentioned. Since many matters of combination, arrangement, structure, form and detail may be variously modified without departing from the underlying principles, it is not intended to limit the invention to such matters except so far as specified in the appended claims.

What is claimed is:

1. Power transmission apparatus comprising rotary driving and driven members, a support revolved by the driving member, a planet member mounted on said support, and a connection from the driven member to the planet member for rotating it, a mass, and means on the planet member operative to constrain the mass to travel in a path differing at substantially all times from the natural path thereof and thereby to give reactions tending continuously to resist said rotation of the planet member.

2. Power transmission apparatus comprising rotary driving and driven members, a support revolved by the driving member, a centrifugal body, a device for controlling the movements of the body mounted on the support and carried around bodily thereby and a connection from the driven member to said device for actuating said device, the device having means engaging the body and acting at all times to deflect the body inwardly from its natural centrifugal path, whereby its centrifugal force acts to resist the actuation of the control device and thereby transmit power continuously in one direction to the driven member.

3. Power transmission apparatus comprising rotary driving and driven members in combination with a support revolved by the driving member, a planet member arranged on said support to be revolved bodily by the rotation of the driving member while rotatable on its own axis, a centrifugal body cooperatively engaged with the planet member but capable of relative motion thereon, means whereby the planet member is rotated with an activity increasing with the relative slowing of the driven member; the planet member having means acting upon the body at all times to contrain it from its natural path, whereby the body, through its centrifugal force, substantially continuously resists the rotation of the planet member and hence causes continuous transmission to the driven member in one direction only.

4. Power transmission apparatus comprising rotating driving and driven members, a support revolved by the driving member, a grooved planet member mounted on the support and thereby revolved bodily by the rotation of the driving member, connections from the driven member to the planet member for rotating the planet member, and a centrifugal weight thereon, the groove being shaped to constrain the weight continuously from its natural path, whereby the centrifugal force of the weight tends at all times to resist the planetary rotation and is thereby transmitted to the driven member in one direction only.

5. Power transmission apparatus comprising rotary driving and driven members, combined with a support revolved by the driving member, a planetating carrier mounted on the support and thereby revolved bodily by the driving member, connections from the driven member to said carrier for rotating it, and a centrifugal body in constant but movable engagement with the carrier, the carrier having means reacting with said body to deflect its path in substantially all parts of its operation, whereby the body, through its centrifugal force or inertia resists the planetary rotation of the carrier at all times and thereby delivers substantially continuous torque in one direction to the driven member.

6. Apparatus as in claim 5 and wherein the means on the carrier reacting with the body consists of a guide permitting the body to move freely on the path determined by such guide, with a motion resultant from the movements of the carrier and the centrifugal force in the body.

7. Apparatus as in claim 5 and wherein are a plurality of such carriers and bodies arranged with overlapping actions.

8. Apparatus as in claim 5 and wherein the connections from the driven member to the carrier operate to rotate the carrier in a direction reverse to its bodily revolution when the driven member is rotating slower than the driving member.

9. Apparatus as in claim 5 and wherein the means on the carrier reacting with the body consists of guide means determining a non-concentric path for the body thereon.

10. Apparatus as in claim 5 and wherein the means on the carrier reacting with the body consists of a guide for the body acting to constrain or deflect the body at substantially all times from its natural centrifugal course.

11. Apparatus as in claim 5 and wherein the means on the carrier reacting with the body consists of guide means determining a non-concentric path for the body thereon with portions trending from the others toward the carrier axis.

12. Apparatus as in claim 5 and wherein the means on the carrier reacting with the body consists of guide means determining a non-concentric path for the body thereon with a plurality of portions over which the body travels in successive phases with momentary transition between phases.

13. Apparatus as in claim 5 and wherein the means on the carrier reacting with the body consists of guide means determining a non-concentric path for the body thereon with a portion crossing the carrier axis and curved away therefrom at each end.

14. Apparatus as in claim 5 and wherein the means on the carrier reacting with the body consists of guide means determining a non-concentric path for the body thereon in substantially a reversed curve.

15. Apparatus as in claim 5 and wherein the means on the carrier reacting with the body consists of guide means determining a non-concentric path for the body thereon in substantially an S-shaped curve crossing the axis of the carrier.

16. Apparatus as in claim 5 and wherein the means on the carrier reacting with the body consists of guide means determining a non-concentric path for the body thereon, on which the body may oscillate during transmission, whereby its force resists the planetation in each phase.

17. Apparatus as in claim 5 and wherein the means on the carrier reacting with the body consists of guide means determining a non-concentric path for the body thereon with portions trending from and others toward the carrier axis, over which the body oscillates during transmission.

18. Apparatus as in claim 5 and wherein the means on the carrier reacting with the body consists of guide means determining a non-concentric path for the body thereon with a plurality of portions over which the body travels to and fro in successive phases with momentary transition between phases.

In testimony whereof, I have affixed my signature hereto.

JOHN REECE.
FRANKLIN A. REECE.